July 21, 1953
L. MATROT
2,646,148
CLUTCH ENABLING SIMULTANEOUS AND/OR SELECTIVE
CONTROL OF MORE THAN ONE DRIVEN SHAFTS
Filed March 24, 1950
3 Sheets-Sheet 2
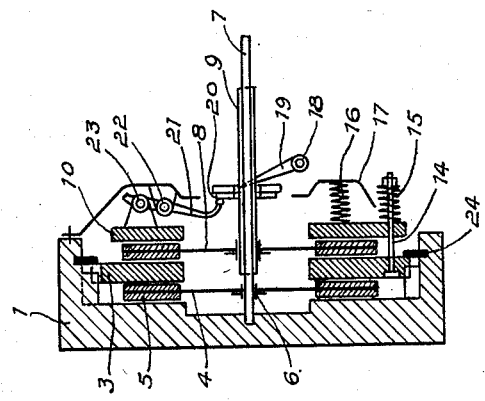
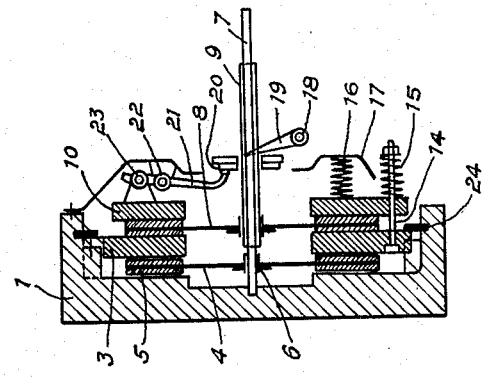
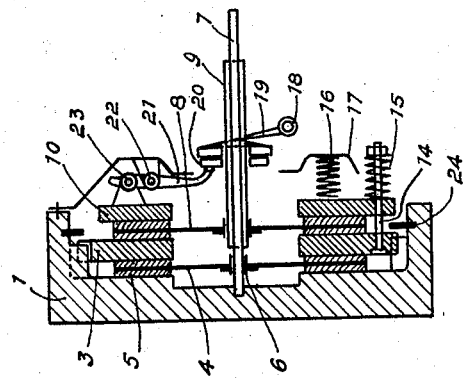
Inventor
LOUIS MATROT
By Flocks and Simon
Attorneys

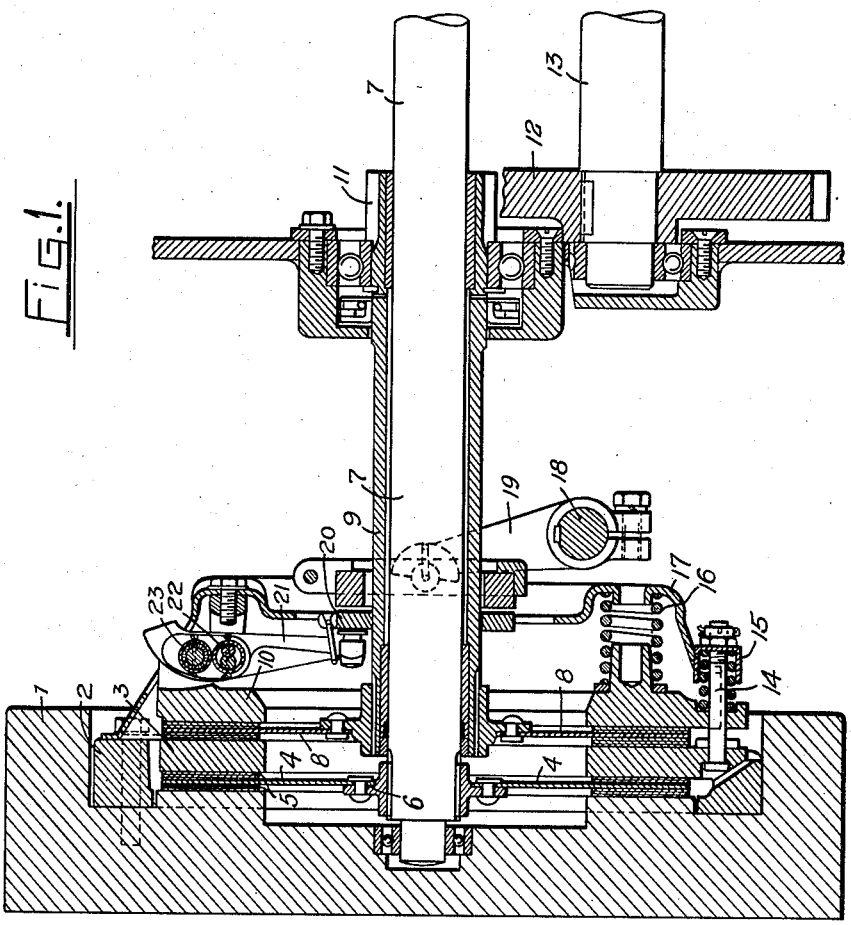

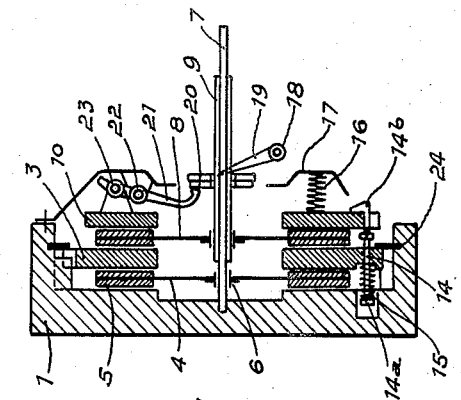
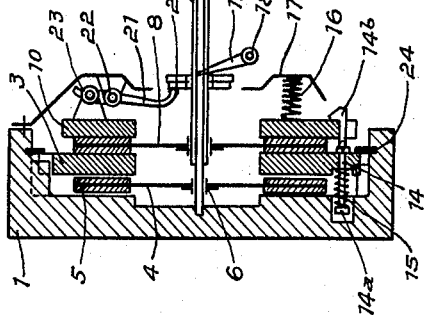
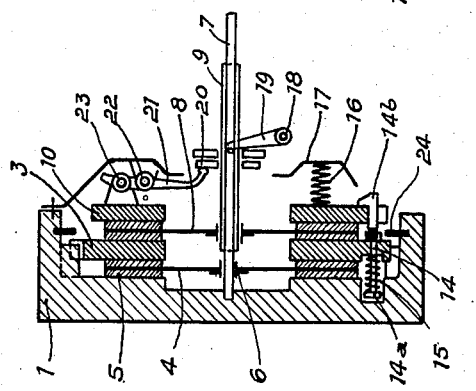

Patented July 21, 1953

2,646,148

UNITED STATES PATENT OFFICE 2,646,148

CLUTCH ENABLING SIMULTANEOUS AND/OR SELECTIVE CONTROL OF MORE THAN ONE DRIVEN SHAFT

Louis Matrot, Noyers St. Martin, France

Application March 24, 1950, Serial No. 151,566
In France March 24, 1949

9 Claims. (Cl. 192—48)

This invention relates to clutch couplings, and more especially to clutch couplings of the selective type.

It is frequently required to transmit a power drive selectively from a single drive shaft to one of two or more driven shafts. This requirement arises in particular on agricultural tractors in which the power from the engine may have to be transmitted to the wheel drive shaft or to the power take-off shaft or to both simultaneously.

This invention provides a double-acting clutch mechanism which provides a satisfactory solution to this problem, being capable of transmitting the power from the drive shaft to only one of two driven shafts, or to both simultaneously, or further of disengaging the power connection to both said driven shafts.

An improved clutch device according to the invention comprises a fly-wheel driven from the drive shaft and co-operating with a first clutch-disk supported on a first driven shaft between the fly-wheel and a first clutch plate, and a further disc carried on a second driven shaft interposed between said first clutch-plate and a second clutch-plate, the axial displacement of which is controlled from a single clutch pedal.

The first above-mentioned clutch-plate which is driven in rotation from the fly-wheel but is capable of longitudinal displacement with respect thereto, is provided with pins on which the second plate is mounted so as to be driven in rotation together with said first clutch-plate.

A first set of springs mounted on said pins at all times urges said plates towards each other and thereby tends to produce a clutched-in condition of said second disc, and accordingly of said second driven shaft.

A second set of springs, independent from the first set is interposed between the casing or frame of the clutch assembly and said second plate, and at all times urges both plates into engagement against the fly-wheel thereby tending to produce the clutched-in condition of said first disc and accordingly of said first driven shaft.

An initial phase of the de-clutching stroke of the clutch pedal is adapted to cause a displacement of said second plate which, owing to the action of the first set of springs, carries the first plate with it and the first plate, being thus moved away from the fly-wheel, releases the first disc and declutches the first driven shaft, while the second shaft remains in its clutched condition owing to the fact that the second disc remains clamped between both plates since the relative position of the plates has not been altered.

The second phase of the declutching stroke of the clutch pedal causes further displacement of the second plate while the first plate is arranged to be arrested in its movement by an appropriate stop means; both plates are thus separated from each other and thus release the second disc and declutch the second driven shaft.

Both driven shafts may conveniently be arranged coaxially with each other.

Means may be provided for indicating the two successive phases of the clutch pedal's travel and for blocking it in its intermediate position.

The above and further objects, features and advantages of the invention will appear with greater clarity as the description proceeds. Two embodiments of a clutch mechanism according to the invention are diagrammatically depicted in the accompanying drawings, given by way of indication and not of limitation, and in which:

Fig. 1 is an axial section of the improved clutch in its engaged condition;

Figs. 2 to 4 are similar views illustrating the device in the three positions it may assume; and Figs. 5 to 7 are views corresponding to Figs. 2 to 4 but relating to a modified embodiment.

As shown in Figs. 1 to 4, the invention provides a clutch which includes a fly-wheel 1 rigid with the drive shaft. The fly-wheel 1 is provided with an annulus 2 which drives in rotation a first clutch plate 3 capable of axial displacement. Between the face of the fly-wheel 1 and the adjacent face of the plate 3 there is interposed a first clutch disc or set of discs 4 provided in the conventional manner with friction facings 5. The disc 4 is mounted on a hub mmeber 6 bodily rotatable with the first driven shaft 7 but capable of axial movement relatively thereto.

A second disc or set of discs 8 is similarly mounted on a tubular intermediate shaft 9 surrounding the shaft 7 and is interposed between the opposite face of the first plate 3 and the adjacent face of a second plate 10. The tubular intermediate shaft 9 is adapted, through any suitable means, such as the meshing gears 11 and 12, to rotate the second driven shaft 13. The second plate 10 is longitudinally slidable on pins 14 carried by the first plate 3. Springs 15 mounted on said pins urge both plates 3 and 10 towards each other and against the second disc 8 thus causing both plates to be driven from the fly-wheel 1. Further springs 16, interposed between the second plate 10 and the casing 17 of the assembly, act on their part simultaneously to clamp the first plate 3 against the fly-wheel 1 and the second plate 10 against the first plate 3, so that it will be seen that this last mentioned action of the springs 16 supplements that of the previously described springs 15.

The above-described clutch mechanism is controlled in the usual way from a clutch pedal, not shown, adapted to rock a shaft 18 on which is secured a lever 19 acting on a ring 20 which in turn operates a set of radially-extending levers 21 each pivoted on a pivot 22 supported on the casing and further pivoted as at 23 to the second plate 10.

The above-described clutch mechanism operates as follows:

In the absence of any pressure applied to the clutch pedal, the mechanism is in its fully clutched condition, as shown in Figs. 1 and 2, in which the springs 15 and 16 maintain the disc 4 firmly clamped between the fly-wheel 1 and the first plate 3, and the second disc 8 firmly clamped between the two plates 3 and 10. Both driven shafts 7 and 13 are thus driven in rotation from the fly-wheel 1.

If the pedal is then depressed to impart to it a limited angular displacement, the levers 21 will slightly move the second plate 10 to the right of the figure to bring it to the position shown in Figure 3 against the opposing action of the springs 16 which are compressed. Under the action of the springs 15, the plate 10 has, through the medium of the pins 14, caused the first plate 3 to move with it, thus releasing the first disc 4 so that the first driven shaft 7 is no longer driven. However, in this position, the springs 15 still act to clamp both plates 3 and 10 the relative position of which has not changed, so that the disc 8 and the second driven shaft 13 are still driven from the fly-wheel; this is the condition of partial clutch engagement.

If the pedal is depressed a further amount, the plate 10 will be moved a further distance to the right, but the plate 3 no longer moves with it, being arrested in its movement by the stop 24. The springs 15 are compressed and the plates 3 and 10 are moved apart and assume the fully declutched condition shown in Fig. 4, in which neither of the driven shafts 7 and 13 is driven. This second action upon the pedal naturally requires exertion of greater force since it causes simultaneous compression of both sets of springs 15 and 16.

It will of course be understood that any convenient means may be provided for indicating to the operator the exact extents of both successive angular displacements of the pedal, and also for releasably retaining it in its intermediate position of partial clutching.

In the modification illustrated in Figs. 5 to 7, the springs 15 are mounted on the opposite face of the plate 3 and act on the enlarged heads 14a of the pins 14 and these pins are further provided with suitable latching means 14b, such as hooks, toggle-links, or the like, which advantageously may be so arranged as to become automatically released as the clutch reaches its position illustrated in Fig. 7. Accordingly, the mechanism will be adapted to assume any one of the conditions illustrated in Figs. 5, 6 and 7, respectively corresponding to the conditions shown in Figs. 2, 3 and 4 for the first embodiment. These three conditions respectively produce full engagement of the clutch, partial engagement, and full disengagement.

It will thus be seen that a clutch mechanism is provided which makes it possible simultaneously to drive two driven shafts and successively to disengage them by means of a single control pedal.

The applications of the above-described mechanism are manifold. Thus it will be valuable on vehicles or tractors wherein the engine drives a wheel-drive shaft and a power-take-off shaft for the drive of various accessory devices such as winches, agricultural machines, etc., which it is necessary to supply with power when the vehicle is moving or stationary. A clutch mechanism according to the invention will make it possible to supply power to the take-off shaft only, while the wheel-drive shaft is not driven.

It is also possible with the clutch mechanism described to clutch in one of the shafts before the other one.

It will be noted, in another connection, that both sets of springs 15 and 16 are completely separate and exert independent actions on their respectively related discs. It is possible therefore to adjust the two sets of springs to different degrees of compression, so that the mechanism will then perform the function of a torque-limiting safety-clutch for each of the two driven shafts.

It will be understood that the structural details illustrated and described may admit of considerable variation within the scope of the invention, and that the improved clutch mechanism herein described may be put to many uses other than those specifically described or mentioned hereinabove.

I claim:

1. In a clutch mechanism of the type described in combination a drive member, a first and a second driven member, a first and a second clutch plate rotatable with but axially slidable with respect to said drive member, a first clutch disc rotatable with but axially slidable with respect to said first driven member interposed between said drive member and a clutch face of said first plate and a second clutch disc rotatable with but slidable with respect to said second driven member interposed between the opposite clutch face of said first plate and a clutch face of said second plate, first spring means urging said plates into engagement against each other to clamp said second disc therebetween and second spring means urging both plates with the said second disc clamped therebetween bodily against said first disc and said drive member, declutching means adapted to move said second plate axially against the action of said second spring means and means arresting the axial movement of said first plate after a limited amount of axial displacement, whereby actuation of said de-clutching means will first move both plates with said second disc clamped therebetween bodily to a position in which only said second driven member is driven and will thereafter move only said second plate to a position in which neither of said driven members is driven.

2. Clutch mechanism as in claim 1 wherein said drive member comprises a fly-wheel rigid with a driven shaft and both said driven shafts are coaxial to each other and to said fly-wheel.

3. Clutch mechanism as in claim 2 wherein the means preventing rotation but allowing axial displacement of said first plate with respect to said fly-wheel comprise inner splines on said fly-wheel and outer splines on the periphery of said first plate in slidable engagement with said inner splines.

4. Clutch mechanism as in claim 3 wherein the means for preventing rotation but allowing relative displacement of said second plate with respect to said first plate and to said drive member comprise angularly spaced pins projecting from said first plate and slidably extending through said second plate.

5. Clutch mechanism as in claim 4 wherein said first spring means comprise coil springs mounted on said pins to urge said plates against each other.

6. Clutch mechanism as in claim 5 including a casing, wherein said second spring means comprise coil springs interposed between said casing and said second plate to urge said second plate towards said fly-wheel.

7. In a clutch mechanism of the type described, in combination, a casing, a drive shaft, a fly-wheel thereon and a clutch facing on said fly-wheel, a first and a second driven shaft coaxial to each other and to said drive shaft, a first clutch plate adjacent to said fly-wheel fixed in rotation but axially slidably relatively thereto and having opposite clutch facings and a second clutch plate on the other side of said first plate from the fly-wheel and having a clutch facing, angularly-spaced pins projecting from said first plate and slidably extending through openings in said second plate, coil springs on said pins urging said plates into engagement, a first clutch disc slidably splined on said first driven shaft interposed between said fly-wheel clutch face and the adjacent clutch facing of said first plate, a second clutch disc slidably splined on said second driven shaft interposed between the opposite clutch facing of said first plate and said clutch facing of the second plate, second coil springs acting between said casing and said second plate to urge it towards said fly-wheel, declutching means operative to axially displace said second plate away from said first plate in opposition to said second springs, and stop means on said fly-wheel positioned to arrest the axial displacement of said first plate only, in an intermediate position during its movement away from said fly-wheel.

8. Clutch mechanism as in claim 7 wherein said declutching means comprise a clutch pedal, linkage means from said pedal to said second plate adapted to produce continuous displacement of said second plate away from said fly-wheel on depression of said pedal, whereby a continued depression of said pedal will first move both said plates with said second disc clamped therebetween bodily away from said fly-wheel to declutch only said first driven shaft and then, after said first plate has been arrested by said stop means, will move only said second plate away from said first plate to declutch said second driven shaft.

9. Clutch mechanism as in claim 1 wherein each of said spring means are adjusted to an individual biassing value whereby said clutch mechanism will operate as a torque-limiting means for each of said driven members.

LOUIS MATROT.

References Cited in the file of this patent
UNITED STATES PATENTS

| Number | Name | Date |
| --- | --- | --- |
| 2,057,559 | De Backer | Oct. 13, 1936 |
| 2,078,466 | Stauffer et al. | Apr. 27, 1937 |
| 2,136,811 | Burtnett | Nov. 15, 1938 |